United States Patent
Karube (10) Patent No.: US 12,548,133 B2
(45) Date of Patent: Feb. 10, 2026

(54) INSPECTION DEVICE

(71) Applicant: HONDA MOTOR CO., LTD., Tokyo (JP)

(72) Inventor: Toshikazu Karube, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 18/191,409

(22) Filed: Mar. 28, 2023

(65) Prior Publication Data
US 2023/0316484 A1  Oct. 5, 2023

(30) Foreign Application Priority Data
Mar. 30, 2022 (JP) ................ 2022-056429

(51) Int. Cl.
| | |
|---|---|
| G06T 7/00 | (2017.01) |
| G06V 10/25 | (2022.01) |
| G06V 10/60 | (2022.01) |
| G06V 10/74 | (2022.01) |

(52) U.S. Cl.
CPC ........... *G06T 7/0002* (2013.01); *G06V 10/25* (2022.01); *G06V 10/60* (2022.01); *G06V 10/761* (2022.01); *G06T 2207/20081* (2013.01)

(58) Field of Classification Search
CPC ......... G06T 7/0002; G06T 2207/20081; G06T 2207/20084; G06T 2207/30164; G06T 7/0004; G06V 10/25; G06V 10/60; G06V 10/761; G06V 10/774; G06V 20/52;
(Continued)

(56) References Cited

U.S. PATENT DOCUMENTS

| | | | |
|---|---|---|---|
| 2019/0130279 A1* | 5/2019 | Beggel | G06V 10/82 |
| 2020/0250801 A1* | 8/2020 | He | G06T 7/0008 |
| 2021/0080399 A1 | 3/2021 | Hatahori et al. | |

(Continued)

FOREIGN PATENT DOCUMENTS

| | | |
|---|---|---|
| CN | 110866891 A | 3/2020 |
| CN | 114022442 A | 2/2022 |

(Continued)

OTHER PUBLICATIONS

Notice of Reasons for Refusal issued by the Japanese Patent Office on Oct. 31, 2023 in corresponding JP Patent Application No. 2022-056429, with English translation.
(Continued)

*Primary Examiner* — Xuemei G Chen
(74) *Attorney, Agent, or Firm* — Carter, DeLuca & Farrell LLP (57) ABSTRACT

An inspection device 1 that inspects whether an image to be inspected is a normal image or an abnormal image includes a learning unit 20A that learns so as to enable reconstruction of normal image data, an error calculation unit 23 that calculates a reconstruction error when a plurality of pieces of input image data are input to the learning unit 20A, a threshold calculation unit 24 that calculates a threshold based on the reconstruction error, and an identification unit 25 that performs identification based on the threshold. The error calculation unit 23 sequentially compares input image data DI and output image data DO while scanning a detection area E on an image data.

6 Claims, 7 Drawing Sheets

(58) Field of Classification Search
CPC .... G06V 10/764; G06V 10/82; G06N 3/0455; G06N 3/08
See application file for complete search history.

(56) References Cited

U.S. PATENT DOCUMENTS

| | | | |
|---|---|---|---|
| 2021/0173193 A1 | 6/2021 | Abe | |
| 2021/0281745 A1* | 9/2021 | Hibi | H04N 23/69 |
| 2022/0156513 A1* | 5/2022 | Lee | G06V 10/26 |
| 2022/0222799 A1* | 7/2022 | Chen | G06T 7/001 |
| 2022/0253998 A1* | 8/2022 | Chien | G06V 10/82 |
| 2022/0254022 A1* | 8/2022 | Karki | G06T 7/136 |
| 2022/0284563 A1* | 9/2022 | Lu | G06F 18/2433 |
| 2023/0090743 A1* | 3/2023 | Pinto | G06T 7/10 382/141 |
| 2024/0152756 A1* | 5/2024 | Lakshmanan | G06N 3/084 |
| 2024/0160196 A1* | 5/2024 | Zhou | G06N 20/00 |
| 2024/0193760 A1* | 6/2024 | Fukuda | H01L 22/00 |

FOREIGN PATENT DOCUMENTS

| | | |
|---|---|---|
| JP | 2021-047090 A | 3/2021 |
| JP | 2021-144314 A | 9/2021 |
| JP | 2021-174456 A | 11/2021 |
| JP | 2021-189039 A | 12/2021 |
| WO | 2020/031984 A1 | 2/2020 |
| WO | 2020/070777 A1 | 4/2020 |
| WO | 2021181749 A1 | 9/2021 |

OTHER PUBLICATIONS

Chinese Office Action issued in corresponding CN Patent Application No. 202310312348.3, dated Nov. 28, 2025, with English translation.

"How do I set the reconstruction error threshold for anomaly detection in an automatic encoder?" https://cloud.tencent.com/developer/ask/sof/116088019 (Jul. 2019), with English translation.

* cited by examiner

INSPECTION DEVICE

BACKGROUND

Technical Field

The present invention relates to an inspection device that performs an inspection to identify, using machine learning, whether an image to be inspected belongs to a normal image or an abnormal image.

Related Art

In image classification that classifies whether an image is a normal image or an abnormal image using machine learning based on a neural network, an identifier is caused to learn using an image whose classification label is known. Examples of the identifier include a variational autoencoder (VAE) identifier. When an image to be inspected is input as an input image, the VAE identifier that has learned attempts to generate an output image similar to the input image. Here, the VAE identifier calculates a reconstruction error by comparing the input image with the output image, classifies the inspection target image as a normal image when the reconstruction error in the predetermined parameter is smaller than a threshold, and classifies the inspection target image as an abnormal image when the reconstruction error is larger than the threshold.

As described above, the VAE identifier performs label estimation based on the value of the reconstruction error between the input image and the output image. Here, in a case where an abnormal region is small relative to the entire image, there is almost no difference between the reconstruction error of the normal image and the reconstruction error of the abnormal image when the VAE identifier is caused to learn. If the reconstruction error of the normal image and the reconstruction error of the abnormal image are mixed in a predetermined parameter, the threshold in the predetermined parameter is ambiguous. In this case, binary classification is difficult, and there arises a problem that the accuracy of identification (label estimation) decreases.

To address this problem, in JP 2021-144314 A, a variational autoencoder is caused to learn using a plurality of target images as learning data such that an error between an input and an output is small and the average, variance, and high-order statistic of a distribution approximated by a specific distribution are output for each unit pixel. Then, a reconstruction error is determined for each unit pixel of the target image to detect an abnormality in the image to be inspected. This can increase the possibility of binary classification in a case where the abnormal region is minute.

SUMMARY

However, the abnormal region is not necessarily as minute as the unit pixel. For example, even if the difference in color tone per unit pixel between the normal portion and the abnormal portion is small, the abnormal region may be recognized when the entire image is viewed. In this case, in the method of checking the reconstruction error for all the pixels for each unit pixel, there is a problem that an abnormal region that can be visually recognized may be overlooked and may not be determined as an abnormal image.

An object of the present invention is to provide an inspection device that performs an inspection to more accurately identify, using machine learning, whether an image to be inspected belongs to a normal image or an abnormal image.

In order to achieve this object, an invention according to claim 1 is an inspection device (1) that inspects whether image data to be inspected belongs to normal image data ("D1" in the present embodiment (the same applies hereinafter)) or abnormal image data (D2), the inspection device (1) including: a learning unit (20A) that learns using a plurality of pieces of normal image data until the normal image data can be reconstructed; an error calculation unit (23) that inputs image data including the plurality of pieces of normal image data and a plurality of pieces of abnormal image data to the learning unit as input image data, obtains respective output image data, and calculates an error in a predetermined parameter between the input image data and the output image data (reconstruction error); a threshold calculation unit (24) that calculates a threshold based on the error when the normal image data is used as input image data and the error when the abnormal image data is used as input image data; and an identification unit (25) that identifies whether the image to be inspected belongs to the normal image data and the abnormal image data based on the threshold, wherein the error the error by setting a detection area (E) that is an area having a correspondence between the input image data and the output image data and is an area including a plurality of pixels, and sequentially comparing the input image data and the output image data while scanning the detection area on the image data.

As described above, the reconstruction error is calculated by setting the detection area including the plurality of pixels on the image data, and sequentially comparing the input image data and the output image data while scanning the detection area on the image data. By setting the detection area according to the size of an abnormal region and performing a comparison while scanning the detection area, it is possible to calculate the reconstruction error in the abnormal region more accurately than when the comparison is performed for each unit pixel. In particular, even when the abnormal region is larger than the unit pixel and the abnormal region has a small difference in color tone or the like per unit pixel, the reconstruction error can be accurately calculated. Therefore, it is possible to provide an inspection device that performs an inspection to more accurately identify, using machine learning, whether the image to be inspected belongs to a normal image or an abnormal image.

An invention according to claim 2 is the inspection device according to claim 1, wherein the error calculation unit scans the detection areas such that the detection areas overlap each other.

Thus, when the error calculation unit scans the detection areas such that the detection areas overlap each other, the reconstruction error in the abnormal region can be appropriately determined even in a case where the size of the abnormal region exceeds the size of one detection area. Therefore, the inspection accuracy of the inspection device can be maintained high.

An invention according to claim 3 is the inspection device according to claim 1, wherein the error the error using the square mean value of differences in the predetermined parameter between the input image data and the output image data.

Thus, it is possible to appropriately evaluate the difference in the predetermined parameter of the output image data from the input image data by calculating the reconstruction error using the square mean value of the differences between the input image data and the output image data during the calculation of the reconstruction error.

An invention according to claim 4 is the inspection device according to claim 1, further including an input unit to which a user inputs the size of the detection area.

Thus, by further providing the input unit to which the user inputs the size of the detection area, for example, it is possible for a user having a high inspection skill to input the size or the shape such as the aspect ratio of the detection area such that the reconstruction error is made clear near the abnormal region. Therefore, it is possible to increase the inspection accuracy of the inspection device.

An invention according to claim 5 is the inspection device according to claim 1, wherein the error calculation unit uniformly scans the detection areas on the image area.

Thus, by uniformly scanning the detection area on the image data when calculating the reconstruction error, the accuracy of the calculation of the reconstruction error is not biased regardless of where the abnormal region is located in the image data.

An invention according to claim 6 is the inspection device according to claim 1, wherein the predetermined parameter is any one of hue, brightness, and luminance in the image data.

Thus, by setting any one of hue, brightness, and luminance in the image data as the predetermined parameter serving as a reference for the calculation of the reconstruction error, it is possible to appropriately evaluate the difference of the image data.

Thus, by using the autoencoder as the learning unit and causing the autoencoder to perform reconstruction, it is possible to efficiently obtain the reconstruction error.

DETAILED DESCRIPTION

Hereinafter, in the present embodiment, an inspection device 1 using a learning model obtained by machine learning will be described in detail with reference to the drawings. In the inspection device 1 according to the present embodiment, a device that performs an inspection to identify a normal product and an abnormal product is taken as an example of a device that performs an inspection to identify two classes. Specifically, the inspection device 1 inspects whether image data to be inspected belongs to normal image data or abnormal image data. Hereinafter, a first class is described as a normal image class C1, a second class is described as an abnormal image class C2, first class data is described as normal image data D1, and second class data is described as abnormal image data D2. The normal image data D1 is classified into the normal image class C1, and the abnormal image data D2 is classified into the abnormal image class C2. Note that, in the following description, "image" may indicate "image data" that can be controlled by a control unit. In addition, VAE is used as an abbreviation for variational autoencoder as necessary.

Figure 1:
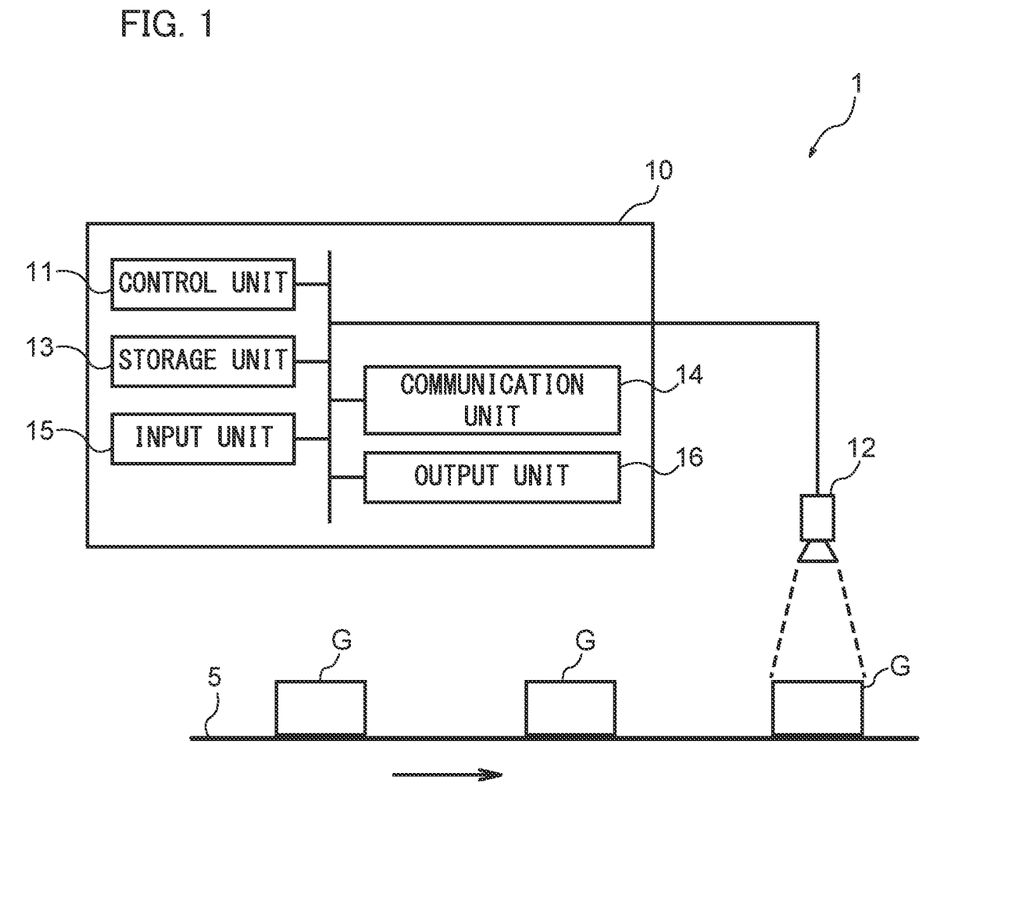
FIG. 1 is a schematic diagram illustrating a hardware configuration of an inspection device.

FIG. 1 is a schematic diagram illustrating a hardware configuration of the inspection device 1. As illustrated in FIG. 1, the inspection device 1 of the present embodiment inspects an inspection product G to be inspected, which is conveyed on a conveyor 5. The inspection device 1 inspects the inspection product G, and inspects whether the inspection product G is a normal product (good product) satisfying a predetermined quality or an abnormal product (defective product) not satisfying the predetermined quality. The inspection device 1 includes a control unit 11, an imaging unit 12, a storage unit 13, a communication unit 14, an input unit 15, an output unit 16, and the like. These units may be arranged in an information processing device 10 such as a computer or may be configured to be communicable, and are connected by a communication line or wirelessly so as to exchange information with each other.

The control unit 11 has a central processing unit (CPU) and controls operation of each unit of the inspection device 1. The control by the control unit 11 is performed by executing a program stored in the storage unit 13 or a main storage unit (not illustrated) in the control unit 11.

The imaging unit 12 includes a camera or the like. In the present embodiment, the inspection product G conveyed by the conveyor 5 is imaged, and the obtained image data is transmitted to the information processing device 10. Note that, although FIG. 1 illustrates the example in which one camera is arranged, the present invention is not limited thereto and may be configured such that a plurality of cameras are arranged and the inspection product G is imaged from a plurality of angles.

The storage unit 13 is a general device performing storage including a random access memory (RAM) and a read only memory (ROM). In addition to a program executed by the control unit 11 and the image data acquired by the imaging unit 12, data necessary for the inspection in the inspection device 1 such as data learned by a neural network is stored in the storage unit 13. Note that FIG. 1 illustrates an example in which the storage unit 13 is arranged inside the information processing device 10. However, the present invention is not limited thereto, and part or all of the storage unit 13 may be arranged outside the information processing device 10 and may be communicable with the information processing device 10 via the Internet.

The communication unit 14 is a mean that communicates between the information processing device 10 and an external device. In a case where the imaging unit 12, the storage unit 13, the input unit 15, the output unit 16, and the like are located outside the information processing device 10, the communication unit 14 communicates with the control unit 11 in the information processing device 10 using a well-known technique such as a wireless communication line.

The input unit 15 is a unit by which a user or the like of the inspection device 1 inputs data to the information processing device 10, and includes a keyboard, a mouse, and the like. The user can input data related to learning, an instruction to the control unit 11, and the like from the input unit 15. Since the input unit 15 is provided in the inspection device 1, the user can input the size (width and height) and the shape of a detection area E to be described later using the input unit 15. If the user is an expert in inspection, it is possible to set an appropriate inspection area for the size and shape of an abnormal region.

The output unit 16 is a means that outputs information regarding the inspection, and is a general means that outputs information in the information processing device 10, such as an image display means such as a display, an audio output means such as a speaker, or an output terminal that outputs data. The output unit 16 can indicate an inspection status to the user by not only outputting a determination result in the inspection device 1 but also displaying information regarding the inspection.

Figure 2:
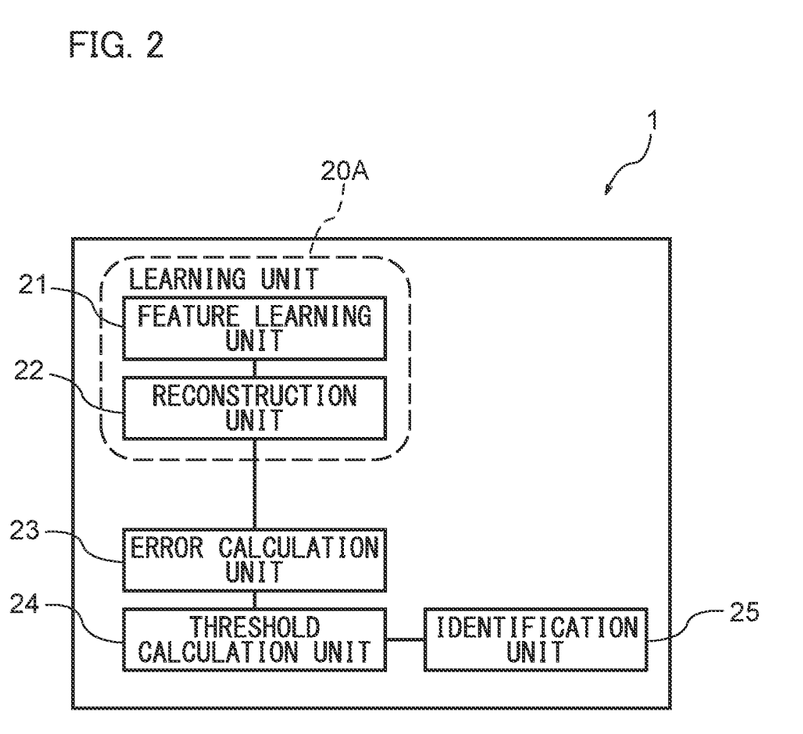
FIG. 2 is a block diagram illustrating a software configuration of the inspection device.

FIG. 2 is a block diagram illustrating a software configuration of the inspection device 1. The software of the inspection device 1 includes a learning unit 20A that performs machine learning, an error calculation unit 23, a threshold calculation unit 24, and an identification unit 25.

The learning unit 20A has an autoencoder, and performs learning by the autoencoder. In the present embodiment, an example in which a variational autoencoder (VAE) is used as the learning unit 20A will be described. The learning unit 20A includes a feature learning unit 21 and a reconstruction unit 22.

The feature learning unit 21 learns a feature in the process of generating output image data similar to input image data in the VAE. In the present embodiment, the feature learning unit 21 inputs the normal image data D1 to the VAE as the input image data and generates output image data similar to the normal image data D1. In this process, the VAE learns the feature.

The reconstruction unit 22 reconstructs the input image data using the feature learned by the feature learning unit 21. Specifically, the reconstruction unit 22 generates the output image data by compressing the input image data with an encoder to obtain a latent variable, and then reconstructing the latent variable with a decoder. In the present embodiment, each of the normal image data D1 and the abnormal image data D2 is input to the reconstruction unit 22 as the input image data and the output image data is generated. The abnormal image data D2 partially includes an abnormal region B that is a region including a defective portion.

The error calculation unit 23 compares the input image data and the output image data in the reconstruction unit 22 based on a predetermined parameter, and calculates an error when the output image data is reconstructed from the input image data (hereinafter, this error is referred to as a "reconstruction error"). Examples of the predetermined parameter include, but are not limited to, hue, brightness, and luminance in the image data. In addition, as a method of calculating the reconstruction error, for example, the reconstruction error is calculated using the square mean value of differences in the predetermined parameter between the input image data and the output image data. However, the method of calculating the reconstruction error is not limited thereto.

Under the control by the control unit 11, the identification unit 25 identifies which one of two classes, the normal image class C1 and the abnormal image class C2, an image related to the inspection target belongs to, using the result of the threshold calculation unit 24.

Note that the functions of the feature learning unit 21 to the identification unit 25 can also be implemented using a VAE identifier. The VAE identifier according to the present embodiment reconstructs the output image data from the input image data using the VAE, and calculates the reconstruction error. The reconstruction error is calculated as the square mean value of differences between the input and the output. The VAE is caused to learn only the normal image data to reduce the reconstruction error. The VAE identifier that has learned in this manner calculates the reconstruction error when the image data related to the inspection target is input, and identifies that the inspection target is a normal product when the reconstruction error is smaller than a threshold.

Figure 3:
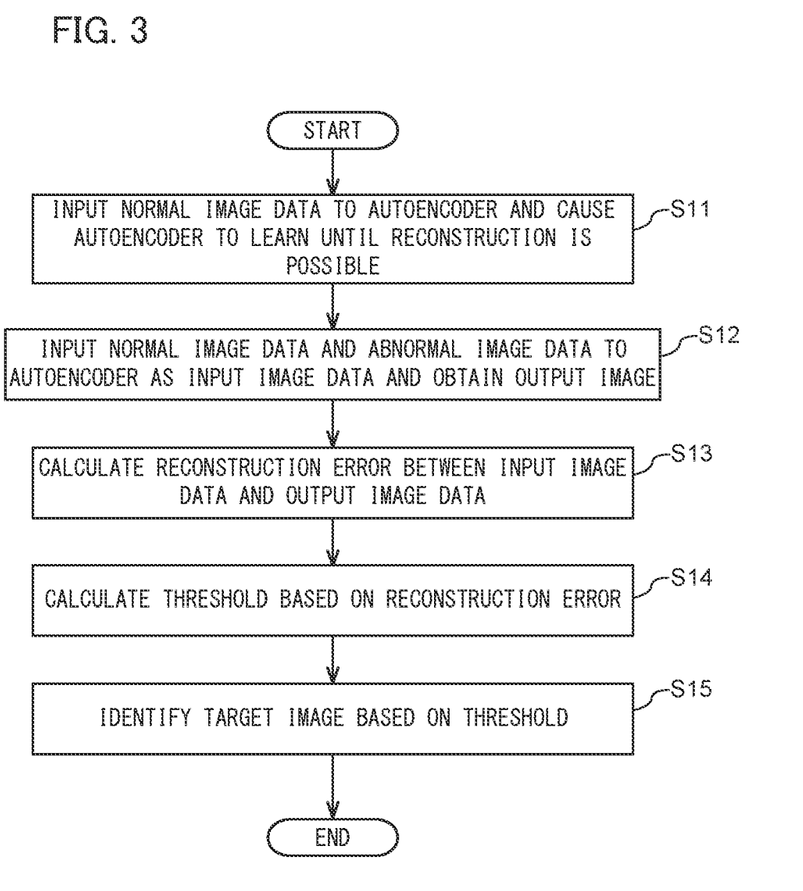
FIG. 3 is a flowchart illustrating a schematic procedure of operation of the inspection device.

FIG. 3 is a flowchart illustrating a schematic procedure of operation of the inspection device 1. The processing illustrated in the flowchart of FIG. 3 is executed by the CPU of the control unit 11 while developing a program stored in the ROM of the storage unit 13 in the RAM or the like, for example.

In step S11, a plurality of pieces of normal image data D1 are input to the feature learning unit 21 of the learning unit 20A until the normal image data D1 can be reconstructed to cause the VAE to learn the feature. Here, learning until the normal image data D1 can be reconstructed means learning until the reconstruction error becomes a minimum. Through the learning, the VAE can generate image data similar to the input image data when the normal image data is input.

In step S12, a plurality of pieces of normal image data D1 and a plurality of pieces of abnormal image data D2 are labelled and input to the reconstruction unit 22 of the learning unit 20A as input image data to obtain output image data for each data. The output image data is reconstructed image data obtained by using the result of learning in step S11.

In step S13, the reconstruction error in a predetermined parameter between the input image data and the output image data is calculated. The predetermined parameter in the present embodiment is a luminance value of each image data, but may be a hue value, a brightness value, or the like. Steps S12 and S13 are defined as an error acquisition step. Through the error acquisition step, the reconstruction error value using the normal image data D1 as an input and the reconstruction error value using the abnormal image data D2 as an input are obtained. Thereafter, the reconstruction errors in the predetermined parameter are compared. The methods of calculating the reconstruction error and comparing the reconstruction errors in the predetermined parameter will be described later in detail with reference to graphs (see FIGS. 4 to 7).

In step S14, a threshold is calculated based on the reconstruction error when the normal image data D1 is used as the input image data and the reconstruction error when the abnormal image data D2 is used as the input image data. Through this threshold calculation step, a threshold to be used for identification is obtained.

In step S15, based on the threshold obtained in step S14, it is identified whether the image to be inspected belongs to the normal image class C1 to which the normal image data D1 belongs or the abnormal image class C2 to which the abnormal image data D2 belongs. Note that step S15 does not need to be performed immediately after step S14, and may be performed according to an instruction by a user or the like from another device after the threshold calculation in step S14.

Figure 4:
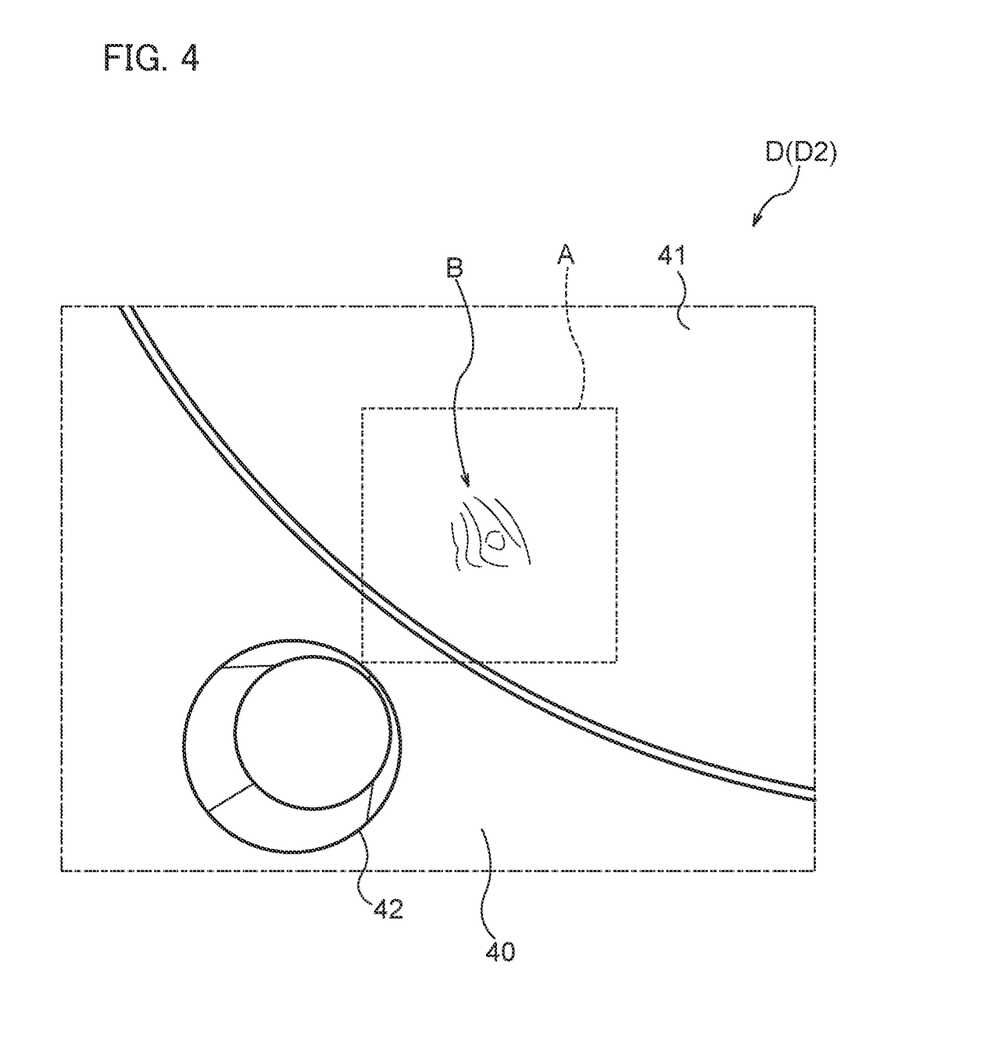
FIG. 4 is a view illustrating an example of image data having an abnormal region.

Next, the methods of calculating the reconstruction error and comparing the data in the predetermined parameter will be described with reference to examples of FIGS. 4 to 6. First, an example of image data D acquired from the imaging unit 12 or an external device will be described with reference to FIG. 4. FIG. 4 is a view illustrating an example of image data D (abnormal image data D2) having an abnormal region B. In FIG. 4, the image data D is image data obtained by imaging a part of a metal plate 41 arranged on a metal base 40 and a hole 42 formed on the base 40. The metal plate 41 partially has the abnormal region B including the defective portion such as a scratch or deformation. The following description will be given using the image data D. In the following description, a region A including the abnormal region B and a portion around the abnormal region B will be enlarged for description.

Figure 5:
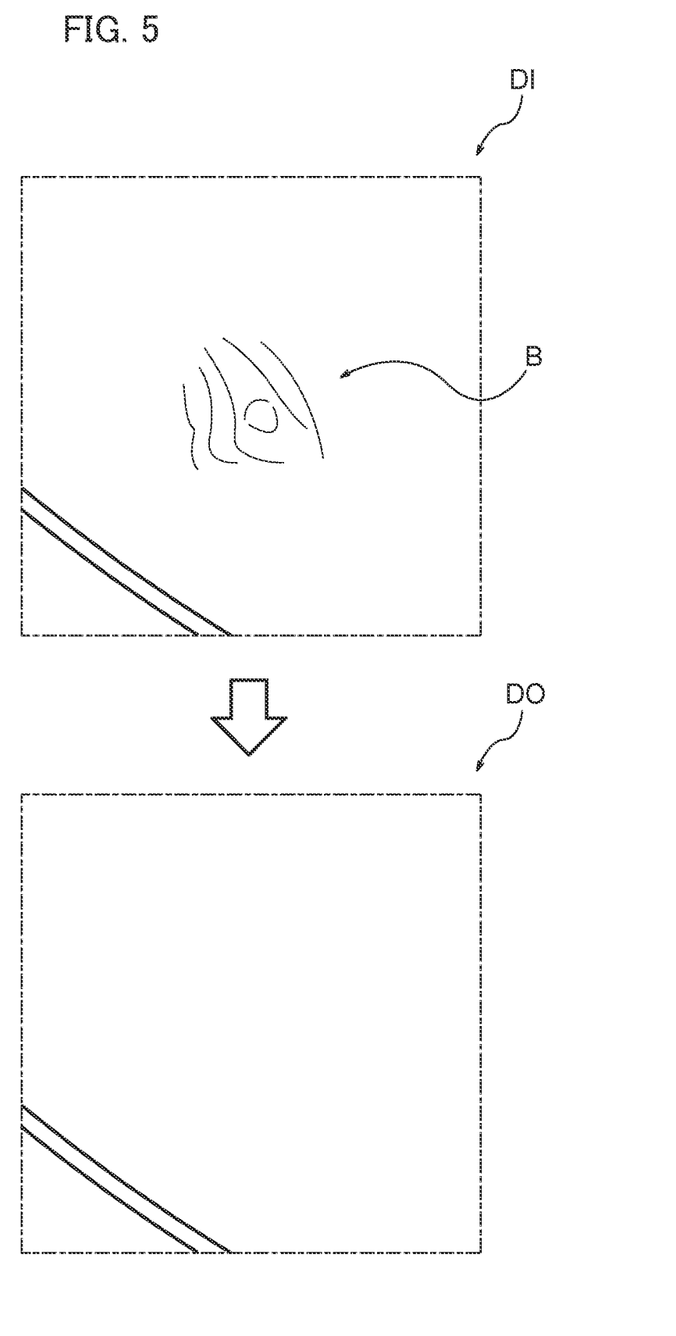
FIG. 5 is a view illustrating an example in which a reconstruction unit reconstructs input image data into output image data.

FIG. 5 is a view illustrating an example in which the reconstruction unit 22 reconstructs input image data DI into output image data DO. The upper view of FIG. 5 is an enlarged view of the region in FIG. 4. In the example of FIG. 5, the abnormal image data D2 is used as the input image data DI. As illustrated in FIG. 5, when the reconstruction is performed using the abnormal image data D2 as the input image data DI, the output image data DO in which the abnormal region B disappears is obtained. This is because the feature learning unit 21 performs learning for reconstruction using only the normal image data D1 before the reconstruction unit 22 reconstructs the abnormal image data D2. For this reason, when the reconstruction is performed using the abnormal image data D2 as in the example of FIG. 5, the reconstruction error tends to be larger than when the normal image data D1 is reconstructed.

Figure 6A:
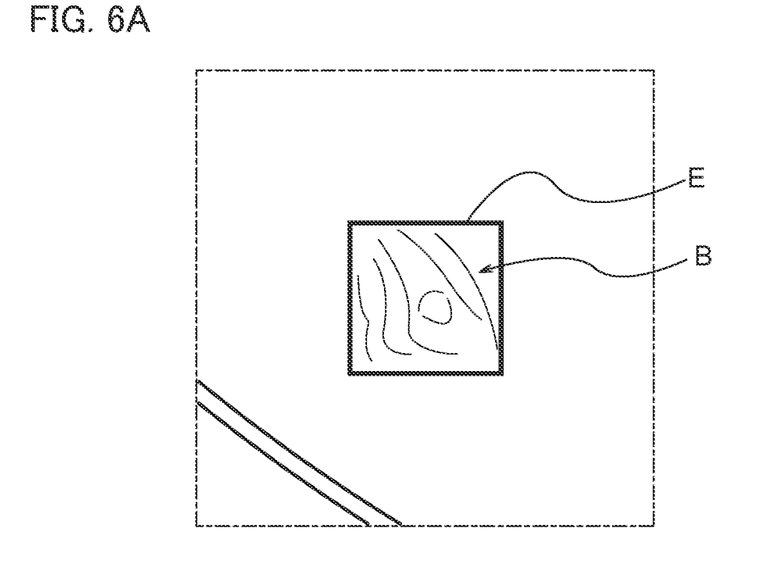
FIG. 6A is a view illustrating the size of the detection area E.
Figure 6B:
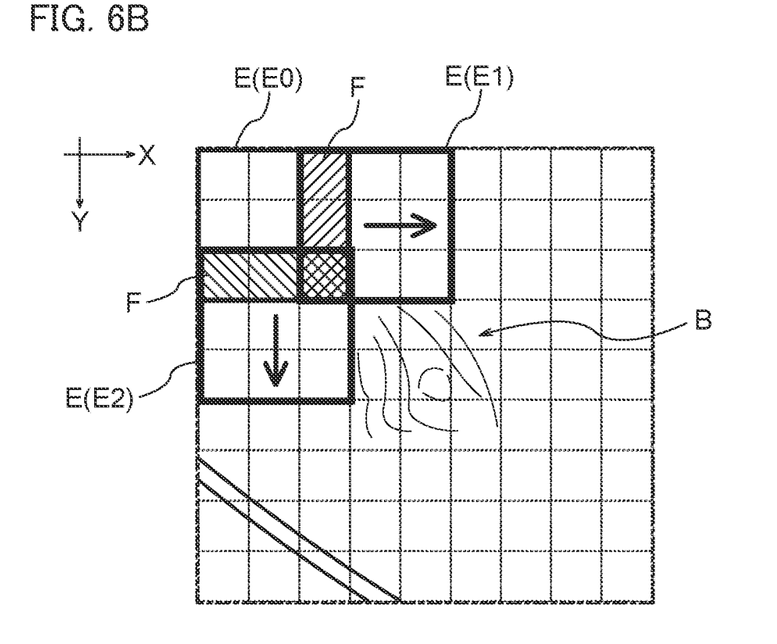
FIG. 6B is a view illustrating the method of scanning the detection area E.

FIG. 6A and FIG. 6B are explanatory views of a method of scanning the detection area E in the process of calculating the reconstruction error. The processing of FIG. 6A and FIG. 6B is processing performed by the error calculation unit 23. FIG. 6A is a view illustrating the size of the detection area E, and FIG. 6B is a view illustrating the method of scanning the detection area E.

The detection area E will be described with reference to FIG. 6A. The detection area E is an area serving as a reference for calculating the reconstruction error, and is an area having a correspondence between the input image data DI and the output image data DO. The detection area E is scanned on the image data D, and the input image data DI and the output image data DO are sequentially compared for each detection area E. For the comparison, values of the predetermined parameter are compared.

The size of the detection area E can be arbitrarily set by the user. For the setting, the size of the detection area E is transmitted to the control unit 11 through input by the user using the input unit 15. The size of the detection area E is arbitrary because it depends on the setting by the user or the like, but the detection area E at least includes a plurality of pixels. In addition, the size of the detection area E is preferably equal to the size of the abnormal region B. The size of the detection area E may be set by the user such as the expert in inspection, or may be set by a computer that analyzes data of the past abnormal region B. In the present embodiment, as illustrated in FIG. 6A, description will be given by taking as an example the detection area E having a size surrounding the periphery of the abnormal region B.

The method of scanning the detection area E will be described with reference to FIG. 6B. When a region illustrated in FIG. 6B is divided into an X-axis direction (horizontal direction in the figure) and a Y-axis direction (vertical direction in the figure) for description, the region is divided into 9×9 blocks. The detection area E in the present embodiment has a size corresponding to three blocks in the X-axis direction and a size corresponding to three blocks in the Y-axis direction. Note that a block in the present embodiment is a unit including a predetermined number of pixels, but the present invention is not limited thereto, and one block may be defined as one pixel.

The method of scanning the detection area E on the image (the input image and the output image) for the calculation of the reconstruction error will be described by taking the region illustrated in FIG. 6B as an example. First, the detection area E at the reference position is defined as a detection area E0, and the reconstruction error in the detection area E0 is calculated. Then, scanning is performed in the X-axis direction from the position of the detection area E0 by a predetermined block (corresponding to two blocks in the present embodiment), and the reconstruction error in a detection area E1 is calculated. Then, the detection area E is sequentially scanned in the X-axis direction. When the detection area E reaches the right end of the image, scanning is performed in the Y-axis direction from the position of the detection area E0 by a predetermined block (corresponding to two blocks in the present embodiment), and the reconstruction error in a detection area E2 is calculated. Then, the detection area E is sequentially scanned in the X-axis direction, and when the detection area E reaches the right end of the image, scanning is performed in the Y-axis direction from the position of the detection area E2 by a predetermined block. The steps above are repeated to continue the calculation of the reconstruction error until the detection area E reaches the lower end and the right end of the image.

In the example illustrated in FIG. 6B, scanning is performed so as to have the same moving distance in the X-axis direction and the Y-axis direction when the detection area E is scanned. Thus, it is preferable to uniformly scan the detection area E on the image data in order to perform unbiased error calculation.

In addition, in the example illustrated in FIG. 6B, there is a region where the detection area E0 and the detection area E1 partially overlap (overlapping region F) when the detection area E is scanned. The overlapping region F also exists between the detection area E0 and the detection area E2. Thus, the detection areas E overlap each other when the detection areas E are scanned. Therefore, it is possible to accurately determine the reconstruction error in the abnormal region B or the periphery thereof.

Figure 7:
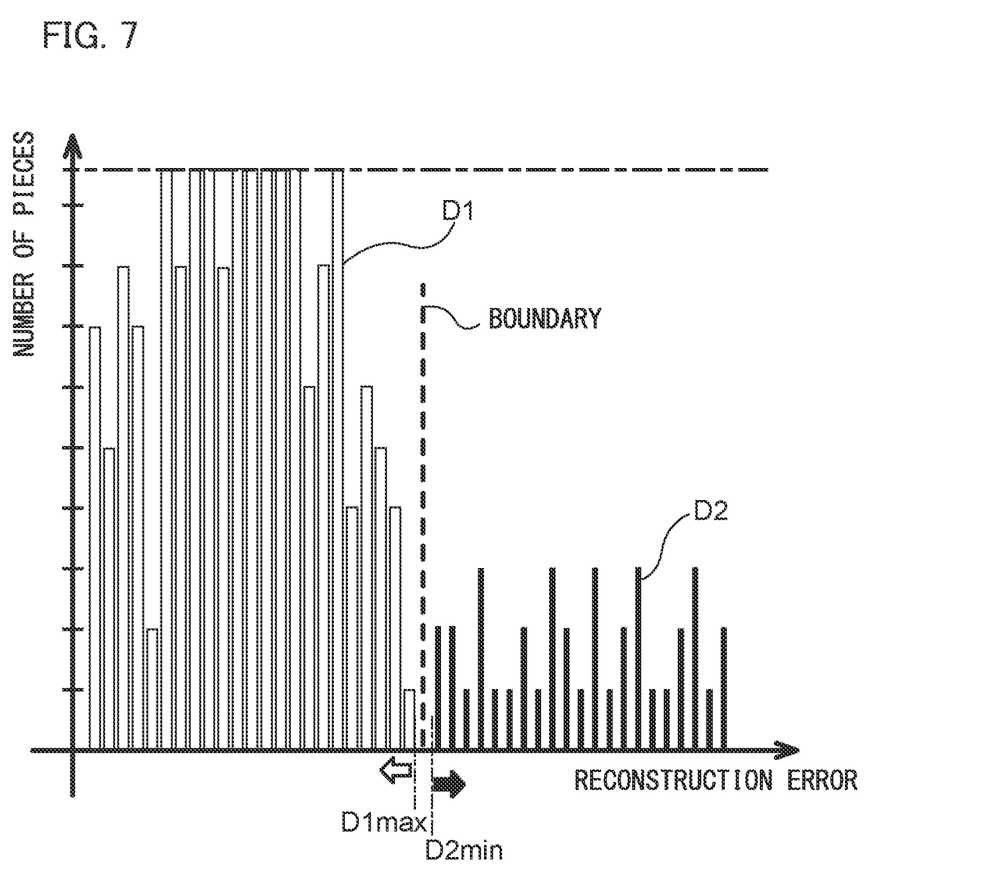
FIG. 7 is a graph illustrating an example of the reconstruction error of a predetermined parameter used during threshold calculation.

FIG. 7 is a graph illustrating an example of the reconstruction error of the predetermined parameter used during threshold calculation. The processing in FIG. 7 is performed by the threshold calculation unit 24. In FIG. 7, the maximum value (D1max) of the reconstruction error of the normal image data D1 is equal to or less than the minimum value (D2min) of the reconstruction error of the abnormal image data D2. In this case, a boundary is conceived between the group of the normal image data D1 and the group of the abnormal image data D2, and the value of the reconstruction error indicated by the boundary is defined as the threshold. Note that the boundary does not necessarily need to be conceived to set the threshold. For example, even in a case where the group of the normal image data D1 and the group of the abnormal image data D2 partially overlap, if there is a value by which the group of the normal image data D1 and the group of the abnormal image data D2 are separated from each other in the overlapping portion, the value is defined as the threshold.

As described above, according to the present embodiment, the reconstruction error is calculated by setting the detection area E including the plurality of pixels on the image data, and sequentially comparing the input image data DI and the output image data DO while scanning the detection area E on the image data D. By setting the detection area E according to the size of the abnormal region B and performing a comparison while scanning the detection area E, it is possible to calculate the reconstruction error in the abnormal region B more accurately than when the comparison is performed for each unit pixel. In particular, even when the abnormal region B is larger than the unit pixel and the abnormal region B has a small difference in color tone or the like per unit pixel, the reconstruction error can be accurately calculated. Therefore, it is possible to provide an inspection device that performs an inspection to more accurately identify, using machine learning, whether the image to be inspected belongs to a normal image or an abnormal image.

According to the present embodiment, the detection areas E overlap each other when the error calculation unit 23 scans the detection areas E. Thus, it is possible to appropriately determine the reconstruction error in the abnormal region B even in a case where the size of the abnormal region B exceeds the size of one detection area E. Therefore, the inspection accuracy of the inspection device 1 can be maintained high.

According to the present embodiment, the reconstruction error is calculated using the square mean value of differences between the input image data DI and the output image data DO during the calculation of the reconstruction error. Thus, it is possible to appropriately evaluate the difference in the predetermined parameter of the output image data DO from the input image data DI.

According to the present embodiment, the input unit 15 to which the user inputs the size of the detection area E is further provided. With this configuration, it is possible for the user having a high inspection skill to input the size or the shape such as the aspect ratio of the detection area E such that the reconstruction error is clear near the abnormal region B. Thus, it is possible to increase the inspection accuracy of the inspection device 1.

According to the present embodiment, the detection area E is uniformly scanned on the image data D when the reconstruction error is calculated. Thus, the accuracy of the calculation of the reconstruction error is not biased regardless of where the abnormal region B is located in the image data D.

According to the present embodiment, any one of hue, brightness, and luminance in the image data D is set as the predetermined parameter serving as a reference for the calculation of the reconstruction error. Thus, it is possible to appropriately evaluate the difference between the input image data DI and the output image data DO.

According to the present embodiment, the learning unit 20A is an autoencoder. Thus, it is possible to efficiently obtain the reconstruction error by causing the autoencoder to perform the reconstruction.

The present invention is not limited to the embodiment described above but may be practiced in various aspects. In addition, the present invention can be implemented by processing in which the processor of the control unit reads and executes the program that implements each unit of the above-described embodiment.

What is claimed is:

1. An inspection device that inspects whether image data to be inspected belongs to normal image data or abnormal image data, the inspection device comprising:
   an autoencoder that learns using a plurality of pieces of normal image data until the normal image data can be reconstructed;
   a processor and memory including instructions stored thereon, which when executed by the processor cause the inspection device to input image data including the plurality of pieces of normal image data and a plurality of pieces of abnormal image data to the autoencoder as input image data, obtains respective output image data, and calculates an error in a predetermined parameter between the input image data and the output image data;
   wherein the normal image data and the abnormal image data are mutually distinguished using a boundary line based on the calculated error;
   wherein the processor and memory cause the inspection device to calculate a threshold based on the error when the normal image data is used as input image data and the error when the abnormal image data is used as input image data; and also to identify whether the image to be inspected belongs to the normal image data and the abnormal image data based on the threshold,
   wherein the processor and memory cause the inspection device to calculate the error by setting a detection area that is an area having a correspondence between the input image data and the output image data and is an area including a plurality of pixels, and sequentially comparing the input image data and the output image data while scanning the detection area on the image data.

2. The inspection device according to claim 1, wherein the processor and memory cause the inspection device to scan the detection areas such that the detection areas overlap each other.

3. The inspection device according to claim 1, wherein the processor and memory cause the inspection device to calculate the error using a square mean value of differences in the predetermined parameter between the input image data and the output image data.

4. The inspection device according to claim 1, wherein the processor and memory cause the inspection device to receive a size of the detection area that a user inputs.

5. The inspection device according to claim 1, wherein the processor and memory cause the inspection device to uniformly scan the detection areas on the image area.

6. The inspection device according to claim 1, wherein the predetermined parameter is any one of hue, brightness, and luminance in the image data.

* * * * *